United States Patent
Leigh et al.

(10) Patent No.: US 11,307,182 B2
(45) Date of Patent: Apr. 19, 2022

(54) SYSTEMS AND METHODS OF DETERMINING ISOTOPIC COMPOSITION OF GASEOUS SAMPLES

(71) Applicant: Compact Science Systems Ltd, Newcastle Under Lyme (GB)

(72) Inventors: Dennis Leigh, Newcastle Under Lyme (GB); James Leigh, Newcastle Under Lyme (GB); Paul Jones, Newcastle Under Lyme (GB)

(73) Assignee: COMPACT SCIENCE SYSTEMS LTD, Newcastle Under Lyme (GB)

( * ) Notice: Subject to any disclaimer, the term of this patent is extended or adjusted under 35 U.S.C. 154(b) by 128 days.

(21) Appl. No.: 16/770,225

(22) PCT Filed: Dec. 6, 2018

(86) PCT No.: PCT/EP2018/083745
§ 371 (c)(1),
(2) Date: Jun. 5, 2020

(87) PCT Pub. No.: WO2019/110712
PCT Pub. Date: Jun. 13, 2019

(65) Prior Publication Data
US 2021/0255153 A1    Aug. 19, 2021

(30) Foreign Application Priority Data

Dec. 6, 2017    (GB) ...................................... 1720348

(51) Int. Cl.
*G01N 30/72*    (2006.01)
*B01D 59/44*    (2006.01)
(Continued)

(52) U.S. Cl.
CPC ......... *G01N 30/7206* (2013.01); *B01D 59/44* (2013.01); *G01N 30/84* (2013.01);
(Continued)

(58) Field of Classification Search
CPC .... G01N 30/7206; G01N 30/84; G01N 30/88; G01N 1/38; G01N 2001/387;
(Continued)

(56) References Cited

U.S. PATENT DOCUMENTS

| 5,661,038 A | 8/1997 | Brenna et al. |
| 5,783,741 A | 7/1998 | Ellis et al. |

(Continued)

FOREIGN PATENT DOCUMENTS

| CN | 201998907 U | 10/2011 |
| CN | 202790303 U | 3/2013 |

(Continued)

OTHER PUBLICATIONS

Tobias et al., "Comprehensive Two-Dimensional Gas Chromatography Combustion Isotope Ratio Mass Spectrometry," Analytical Chemistry, vol. 80, pp. 8613-8621, publ. Oct. 14, 2008, DOI: 10.1021/ac801511d. (Year: 2008).*

(Continued)

*Primary Examiner* — Jennifer Wecker
*Assistant Examiner* — Michael Paul Shimek
(74) *Attorney, Agent, or Firm* — Ziegler IP Law Group, LLC

(57) ABSTRACT

A system for determining isotopic composition of a gaseous sample. The system includes at least one gas chromatograph for separating the gaseous sample into gaseous components. Furthermore, the system includes a combustion furnace operatively coupled with the at least one gas chromatograph for oxidizing the gaseous components. Moreover, the system includes a water separator operatively coupled with the combustion furnace. Furthermore, the system includes an isotope-ratio mass spectrometer operatively coupled with the water separator. Moreover, the isotope-ratio mass spectrometer comprises an ion source for generating ion beams (Continued)

associated with each of the oxidized gaseous components and a mass analyser for receiving the generated ion beams from the ion source, wherein the mass analyser is operable to determine isotopic concentrations associated with each of the ion beams. Furthermore, the isotope-ratio mass spectrometer is operable to use the determined isotopic concentrations to determine the isotopic composition of the gaseous sample.

20 Claims, 3 Drawing Sheets

(51) Int. Cl.
| | | |
|---|---|---|
| *G01N 30/84* | (2006.01) | |
| *G01N 30/88* | (2006.01) | |
| *B01J 23/56* | (2006.01) | |
| *G01N 1/38* | (2006.01) | |
| *G01N 30/02* | (2006.01) | |
| *H01J 49/04* | (2006.01) | |

(52) U.S. Cl.
CPC .............. *G01N 30/88* (2013.01); *B01J 23/56* (2013.01); *G01N 1/38* (2013.01); *G01N 2001/387* (2013.01); *G01N 2030/025* (2013.01); *G01N 2030/8435* (2013.01); *G01N 2030/8868* (2013.01); *H01J 49/0422* (2013.01)

(58) Field of Classification Search
CPC ..... G01N 2030/025; G01N 2030/8435; G01N 2030/8868; G01N 33/0006; G01N 33/0047; B01D 59/44; B01J 23/56; H01J 49/0422
See application file for complete search history.

(56) References Cited

U.S. PATENT DOCUMENTS

| | | |
|---|---|---|
| 2005/0082473 A1 | 4/2005 | Socki et al. |
| 2008/0260587 A1 | 10/2008 | Coleman et al. |
| 2009/0314057 A1 | 12/2009 | Hatscher et al. |
| 2010/0101304 A1 | 4/2010 | McIntyre et al. |
| 2012/0142118 A1 | 6/2012 | Brenna et al. |

FOREIGN PATENT DOCUMENTS

| | | |
|---|---|---|
| GB | 2270977 A | 3/1994 |
| WO | 8909486 A1 | 10/1989 |
| WO | 2006014555 A1 | 2/2006 |

OTHER PUBLICATIONS

Verkouteren et al., "Isotopic metrology of carbon dioxide. II. Effects of ion source materials, conductance, emission, and accelerating voltage on dual-inlet cross contamination," Rapid Comm, in Mass Spec., vol. 17, pp. 777-782, publ. 2003. (Year: 2003).*

Ellis et al., published "Mud gas isotope logging (MGIL) assists in oil and gas drilling operations" in Oil and Gas Journal, Pennwall, Houston, TX, US, vol. 101, No. 21, on May 26, 2003, pp. 32-41, 9 pages.

Herbert J. Tobias et al., published "Comprehensive Two-Dimensional Gas Chromatography Combustion Isotope Ratio Miass Spectrometry" in Analytical Chemistry, vol. 80, No. 22 on Nov. 15, 2008, pp. 8613-8621, 9 pages.

W. Meier-Augenstein published "Applied gas chromatography coupled to isotope ratio mass spectrometry" in Journal of Chromatography A, 842 on May 21, 1999, pp. 351-371, 21 pages.

Combined Search and Examination Report issued in GB Patent Application No. GB1720348.0 dated Jun. 6, 2018, 7 pages.

International Search Report and Written Opinion of the International Search Authority issued in International Patent Application No. PCT/EP2018/083745 dated Apr. 4, 2019, 13 pages.

Examination Report under section 18(3) issued in GB Patent Application No. GB1720348.0 dated Nov. 21, 2019, 3 pages.

Written Opinion of the International Preliminary Examining Authority issued in International Patent Application No. PCT/EP2018/083745 dated Nov. 28, 2019, 5 pages.

Written Opinion of the International Preliminary Examining Authority issued in International Patent Application No. PCT/EP2018/083745 dated Feb. 6, 2020, 5 pages.

Notification of Transmittal of the International Preliminary Report on Patentability issued in International Patent Application No. PCT/EP2018/083745 dated Apr. 2, 2020, 18 pages.

\* cited by examiner

SYSTEMS AND METHODS OF DETERMINING ISOTOPIC COMPOSITION OF GASEOUS SAMPLES

TECHNICAL FIELD

The present disclosure relates generally to analytical devices; and more specifically, to systems and methods of determining isotopic composition of gaseous samples.

BACKGROUND

There are several materials present around in the Earth's environment. Some of these materials are well known, while other of these materials may still need to be identified. Furthermore, some of the materials are present on the Earth's surface, while a majority of the materials are present beneath the Earth's surface. The materials that are present beneath the surface of the Earth are usually extracted by using one or more techniques such as drilling, mining and so forth. Furthermore, it is important to analyse these materials in order to determine their compositions, for example, to determine a presence of organic components, hydrocarbons, various isotopes and so forth present therein. Moreover, their analysis is susceptible to identifying various properties that these materials possess and also, their use in different applications.

Conventionally, drilling is a technique that is used to extract fossil fuels and other components from beneath the Earth's surface. While performing a drilling operation, several by-products are obtained, apart from one or more intended products, including, mud, sludge, waste drilling fluids and similar. Furthermore, an analysis of such by-products provides important information, such as, a knowledge of a geological sequence onsite of the drilling operation, and various products that can be extracted by performing the drilling operation. For example, the waste drilling fluid contains various gases mixed with liquid. Such gases can be extracted and used for analysis of composition of mud that is extracted from the drilling operation. Results of such an analysis can be crucial for various reasons, such as, for safety of humans present in a vicinity of the drilling operation, for determination of feasibility of the drilling operation and so forth.

Generally, various techniques are used for performing such analyses. Such techniques employ a device for separating gases from the drilling fluid and subsequently, and for determining a concentration of isotopes present therein. It will be appreciated that an operation of such devices onsite of the drilling operation are subjected to changes in temperature and pressure conditions. Furthermore, to obtain higher accuracy associated with use of such devices, an impact of the changes in temperature and pressure conditions is required to be reduced, such as, by arrangement of the devices in a controlled and vibration-free environment. Therefore, the analyses are commonly performed at an offsite location, such as in a laboratory after extracting gases from the fluid. However, performing offsite analyses may result in varying compositions as compared to actual compositions of the gases that can be observed onsite of the drilling operation. It will be appreciated that, to avoid such variations, there is a need for devices that are capable of performing onsite analysis of the gases.

Conventionally, devices that are used for onsite analysis of the gases have various associated drawbacks. For example, such devices are generally large in size, and require a large area for installation thereof. This drawback increases a cost associated with operation of the devices and consequently, reduces profitability of the drilling operation. Furthermore, the devices require complex climate control arrangements that further increase a complexity and costs associated with the drilling operation. Additionally, such devices are fragile and are easily affected by geological variables such as mechanical vibrations, shocks experienced during the drilling operation and so forth. The fragility of the devices leads to repetitive breakdown thereof and further increases the cost associated with the analyses (and the drilling operation). Furthermore, such devices are generally associated with large analysis times.

Therefore, in light of the foregoing discussion, there exists a need to address, for example to overcome, the aforementioned drawbacks associated with conventional devices that are used for determining isotopic composition of gases, for example, onsite of drilling operations.

SUMMARY

The present disclosure seeks to provide an improved system for determining isotopic composition of a gaseous sample.

The present disclosure also seeks to provide an improved method of determining isotopic composition of a gaseous sample.

Furthermore, the present disclosure seeks to provide a software product recordable on machine-readable data storage media, characterised in that the software product is executable upon computing hardware for implementing an improved method of determining isotopic composition of a gaseous sample.

According to a first aspect, an embodiment of the present disclosure provides a system for determining isotopic composition of a gaseous sample, the system comprises:
  at least one gas chromatograph for separating the gaseous sample into gaseous components;
  a combustion furnace operatively coupled with the at least one gas chromatograph for oxidizing the gaseous components;
  a water separator operatively coupled with the combustion furnace for removing water from the oxidized gaseous components;
  and
  a first shock absorbing arrangement arranged with the water separator, wherein the shock absorbing arrangement is configured to reduce transmission of shocks from water separator to the system; and
  an isotope-ratio mass spectrometer that is operatively coupled with the water separator, the isotope-ratio mass spectrometer comprising:
  an ion source that is configured to generate ion beams associated with each of the oxidized gaseous components;
  a mass analyzer that is configured to receive the generated ion beams from the ion source, wherein the mass analyzer is configured to determine isotopic concentrations associated with each of the ion beams; and
  a second shock absorbing arrangement arranged with the isotope-ratio mass spectrometer, wherein the second shock absorbing arrangement is configured to reduce transmission of shocks from the isotope-ratio mass spectrometer to the system,
wherein the isotope-ratio mass spectrometer is configured to use the determined isotopic concentrations associated with each of the ion beams to determine the isotopic composition of the gaseous sample.

The present disclosure seeks to provide an improved, compact and reliable system and method that substantially overcomes various drawbacks associated with conventional techniques of analysis of isotopic composition of gaseous samples.

Optionally, the ion source and the mass analyser are arranged in a housing.

Optionally, the isotope-ratio mass spectrometer is arranged with a shock absorbing arrangement.

Optionally, the mass analyser comprises:
a mass analysing magnet for deflecting the ion beams received from the ion source; and
a plurality of detectors for detecting isotopic concentrations associated with each of the deflected ion beams.

Optionally, the system further comprises a sample diluter operatively coupled with the at least one gas chromatograph, wherein the sample diluter is operable to dilute the gaseous sample using a carrier gas.

Optionally, the system further comprises a dilution adjustment device operatively coupled to the sample diluter, wherein the dilution adjustment device is operable to employ the determined isotopic concentrations associated with each of the ion beams to modify an amount of the carrier gas employed to dilute the gaseous sample, based on threshold isotopic concentrations associated with each of the ion beams.

Optionally, the dilution adjustment device is further operable to modify the amount of the carrier gas employed to dilute the gaseous sample, iteratively and in real time.

Optionally, the combustion furnace comprises:
a cartridge heater; and
a cylindrical tube wound around the cartridge heater,
wherein the cylindrical tube comprises an oxidation catalyst to promote oxidation of the gaseous components.

Optionally, the cylindrical tube is fabricated using stainless steel.

Optionally, the oxidation catalyst is platinised copper oxide.

Optionally, the water separator comprises:
a hollow cylindrical casing;
a cylindrical support incorporated within the hollow cylindrical casing;
an elongate wire helically coiled around the cylindrical support; and
a tube surrounding the elongate wire;
wherein the oxidized gaseous components are operable to flow through the tube coiled around the cylindrical support.

Optionally, the tube is fabricated using Nafion polymer.

Optionally, the hollow cylindrical casing is fabricated using glass.

Optionally, the water separator is arranged with a shock absorbing arrangement.

According to a second aspect, an embodiment of the present disclosure provides a method of determining isotopic composition of a gaseous sample, the method comprises:
(i) separating the gaseous sample into gaseous components using at least one gas chromatograph;
(ii) oxidizing the gaseous components in a combustion furnace;
(iii) removing water from the oxidized gaseous components using a water separator;
(iv) generating ion beams associated with each of the oxidized gaseous components using an ion source associated with an isotope-ratio mass spectrometer;
(v) determining isotopic concentrations associated with each of the ion beams using a mass analyser; and
(vi) determining by the isotope-ratio mass spectrometer, the isotopic composition of the gaseous sample using the isotopic concentrations associated with each of the ion beams.

Optionally, the method further comprises diluting the gaseous sample using a carrier gas.

More optionally, the method includes diluting the gaseous sample by using the carrier gas under flow conditions. More optionally, the carrier gas as a diluter gas is injected at a sample port, for example where the sample port is included upstream of the at least one gas chromatograph.

Optionally, the method further comprises using a feedback loop to modify an amount of the carrier gas that is used for diluting the gaseous sample, by employing the determined isotopic concentrations associated with each of the ion beams, based on threshold isotopic concentrations associated with each of the ion beams.

Optionally, the method further comprises generating at least one chromatogram associated with the at least one gas chromatograph after separating the gaseous sample into the gaseous components.

Optionally, a first gas chromatograph and a second gas chromatograph of the at least one gas chromatograph are used together for separating the gaseous sample into gaseous components.

Optionally, the method further comprises correlating a first chromatogram associated with the first gas chromatograph and a second chromatogram associated with the second gas chromatograph to obtain an elution order of the gaseous components.

Optionally, the method further comprises comprising:
determining a reference isotopic composition of a reference gaseous sample associated with a predetermined isotopic composition;
determining a correction factor for the isotope-ratio mass spectrometer by correlating the determined reference isotopic composition with the predetermined isotopic composition associated with the reference sample; and
calibrating the isotope-ratio mass spectrometer using the determined correction factor.

According to a third aspect, an embodiment of the present disclosure provides a software product recording on machine-readable data storage media, characterised in that the software product is executable upon computing hardware for implementing a method of determining isotopic composition of a gaseous sample.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with systems for determining isotopic compositions of gaseous samples. Furthermore, embodiments of the present disclosure are concerned with methods of determining isotopic compositions of gaseous samples. Moreover, embodiments of the present disclosure are concerned with software product recordable on machine-readable data storage media and executable upon computing hardware, for implementing the aforementioned methods of determining isotopic composition of gaseous samples.

Figure 1:
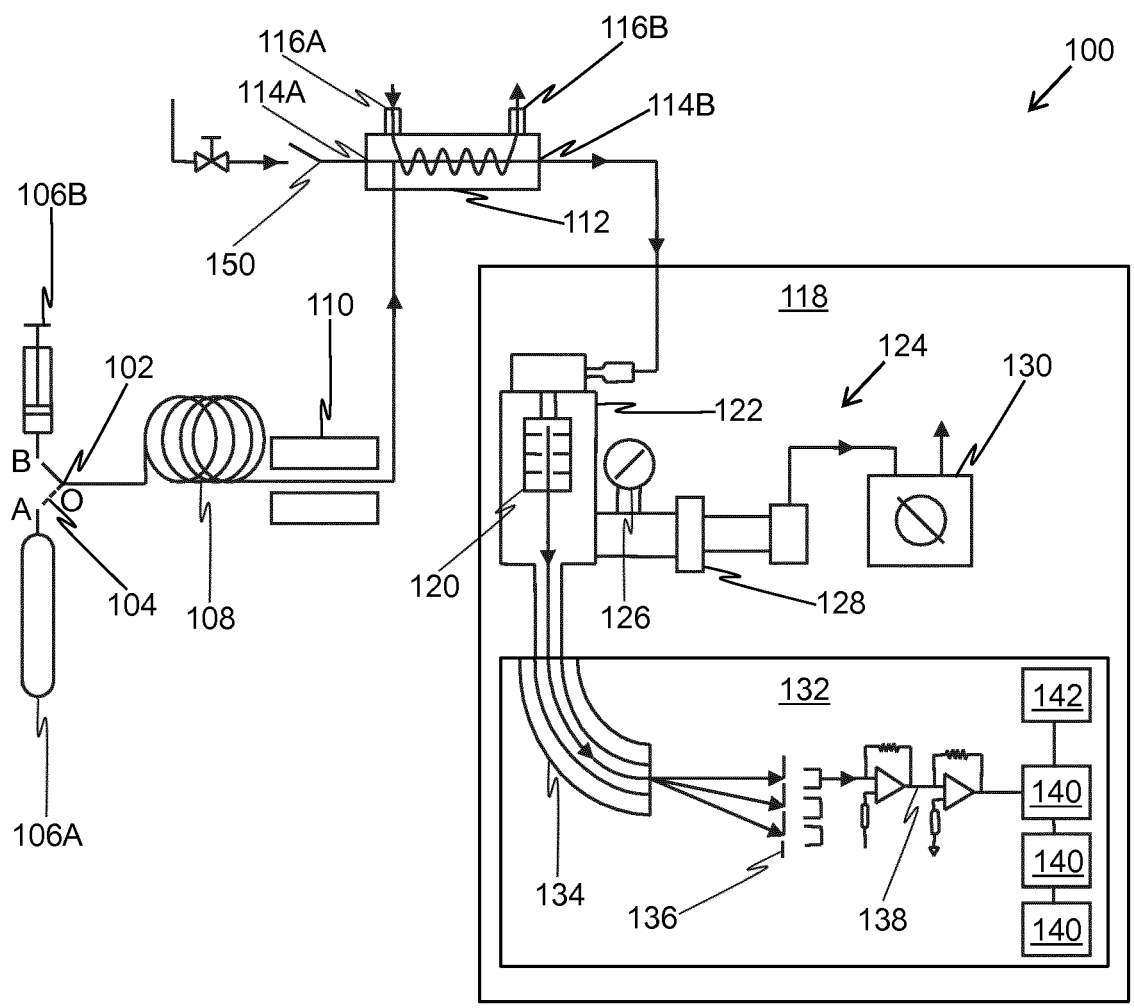
FIG. 1 is a schematic illustration of a system for determining an isotopic composition of a gaseous sample, in accordance with an embodiment of the present disclosure.

Referring to FIG. 1, there is shown a schematic illustration of a system 100 for determining an isotopic composition of a gaseous sample, in accordance with an embodiment of the present disclosure. As shown, the system comprises an inlet 102. The inlet 102 is operatively coupled with a valve 104 that is operable, namely configured, to be in a first position OA and a second position OB. The valve 104, when maintained in the first position OA, enables the inlet 102 to be connected with a carrier gas container 106A. In an example, the carrier gas container is operable, namely configured, to store an inert and/or an unreactive gas (such as a gas known to be unreactive with the gaseous sample). In another example, the carrier gas is Helium or similar noble gas. In yet another example, the carrier gas is Nitrogen. Furthermore, when the valve 104 is switched to the second position OB, a connection is established between the inlet 102 and a gaseous sample container 106B. Moreover, maintaining the valve 104 in the second position OB enables a flow of the gaseous sample stored in the gaseous sample container 106B to occur into the inlet 102. In one example, the gaseous sample is a mud gas that is obtained during a drilling operation, such as, an oil well drilling operation or an offshore drilling operation. Furthermore, such a mud gas can be extracted by performing a degassing operation of a drilling fluid that is obtained during the drilling operation.

In an embodiment, the inlet 102 is operatively coupled with a flow restricting arrangement (not shown). The flow restricting arrangement enables an amount of the gaseous sample flowing from the gaseous sample container 106B into the inlet 102 to be adjusted, for example reduced. Optionally, the flow restricting arrangement enables a manual control (such as, by an on-site technician) of flow of the gaseous sample into the inlet 102.

The system 100 comprises at least one gas chromatograph 108 for separating the gaseous sample into gaseous components. For example, when the gaseous sample is mud gas that is extracted during a well drilling operation, the gaseous sample may comprise a plurality of gaseous components including organic gases such as methane ($CH_4$), ethane ($C_2H_6$), propane ($C_3H_8$), inorganic gases such as carbon dioxide ($CO_2$) and suchlike. In such an example, the gas chromatograph 108 enables the mud gas to be separated into the plurality of gaseous components. In operation, each of the plurality of gaseous components will be retained within the gas chromatograph 108 for a corresponding different duration of time (associated with a retention time). In such an example, in operation, the gaseous components flow out of the gas chromatograph in a specific order (or elution order) based upon their individual retention times. Moreover, in operation, the gas chromatograph 108 generates a chromatogram subsequent to separation of the gaseous sample into the gaseous components; a chromatogram is a graphical representation of concentrations of each the gaseous components, for example as a function of molecular weight or atomic weight. When the concentrations are relatively higher of certain of the gas components, the relatively higher concentrations give rise to peaks in the chromatogram. Thus, for example, such a chromatogram comprises peaks associated with each of the gaseous components separated from the gaseous sample.

According to an embodiment, the at least one gas chromatograph 108 is implemented using a first gas chromatograph and a second gas chromatograph. Furthermore, the first and the second gas chromatographs are used in conjunction with each other. For example, the inlet 102 is connected to both the first and the second gas chromatographs at a same time. In such an example, both the first and the second gas chromatographs are operable, namely are configured, to separate the gaseous sample into its gaseous constituents (namely, for example, gaseous components). Moreover, the first and the second gas chromatographs are operable, namely are configured, to generate a first chromatogram and a second chromatogram, respectively. It will be appreciated that employing the two gas chromatographs together enables a time required for separation of the gaseous sample into the gaseous constituents to be reduced.

In one embodiment, the first chromatogram and the second chromatogram are correlated to obtain an elution order of the gaseous components. For example, the first chromatogram obtained after separation of the gaseous sample from the first gas chromatograph, is superimposed with the second chromatogram obtained after separation of the gaseous sample from the second gas chromatograph; for example, a strong correlation occurs when peaks of chromatograms of the first and second gas chromatographs are mutually coincident. Furthermore, the determined elution order of the gaseous constituents is associated with readings obtained by both the first and the second chromatograms, respectively. It will be appreciated that such an elution order obtained by using the two chromatograms increases an accuracy associated with measuring the determined elution order. Furthermore, a time required for determination of the elution order is reduced.

In an embodiment, the system 100 comprises a sample diluter that is operatively coupled with the at least one gas chromatograph 108, wherein the sample diluter is operable, namely configured, to dilute the gaseous sample using a carrier gas. The sample diluter (not shown) is arranged, namely connected, between the inlet 102 and the at least one gas chromatograph 108. Furthermore, the sample diluter is operable, namely configured, to receive the carrier gas from the carrier gas container 106A. Subsequently, the sample diluter enables a mixture of the carrier gas with the gaseous sample to be achieved, before a flow of the gaseous sample occurs into the at least one gas chromatograph 108. In one example, the sample diluter operates at a pressure of 1 atmosphere (atm) and a volumetric flow rate, for example, in a range of 0.0 to 175 millilitres per minute. Such an operating pressure and volumetric flow rate of the sample diluter reduces isotopic fractionation of the gaseous sample before separation thereof using the at least one gas chromatograph 108.

Auto-Pre-Detection of Sample

The system 100 comprises a combustion furnace 110 that is operatively coupled with the at least one gas chromatograph 108 for oxidizing the gaseous components. The combustion furnace 110 (shown in detail in FIG. 3) is operable, namely configured, to oxidize the gaseous components flowing from the gas chromatograph 108, by combustion thereof. For example, the gaseous components separated from the mud gas comprise methane ($CH_4$), ethane ($C_2H_6$), propane ($C_3H_8$), carbon dioxide ($CO_2$), Ethene (Ethylene) and Propene (Propylene). In such an example, the combustion furnace 110 is operable, namely configured, to oxidize the gaseous components to yield carbon dioxide ($CO_2$) for Methane, Ethane and Propane.

In one example, the combustion furnace 110 operates at a working temperature in a range of 750° C. to 850° C. Furthermore, the combustion furnace 110 is operable, namely is configured, to use an oxidation catalyst to promote oxidation of the gaseous components. In an embodiment, the oxidation catalyst is platinised copper oxide.

The system 100 comprises a water separator 112 that is operatively coupled with the combustion furnace 110 for removing water from the oxidized gaseous components. The water separator 112 (shown in detail in FIG. 4) is operable, namely configured, to dehydrate the oxidised gaseous components flowing out of the combustion furnace 110 by removing moisture therefrom. As shown, the water separator 112 comprises an inlet 114A that is operatively coupled, namely operatively connected, with the combustion furnace 110 for receiving the oxidized gaseous components therefrom. Furthermore, the water separator 112 comprises an outlet 114B for providing for a flow of dehydrated oxidised gaseous components from the water separator 112. In an example, the dehydrated, oxidised gaseous components flow, in operation, at a flow rate, for example, in a range of 5 to 40 millilitres per minute. In another example, the outlet 114B is coupled to a capillary tube having a radius, for example, in a range of 75 to 150 micrometres. Moreover, as shown, the water separator 112 comprises an inlet 116A for receiving a carrier gas, for removing moisture from the oxidised gaseous components in the water separator 112. The carrier gas, subsequent to removing moisture from the oxidised gaseous components, is removed from the outlet 116B. In one example, the carrier gas is associated with a volumetric flow rate, for example, in a range of to 60 millilitres per minute through the water separator 112.

The system comprises an isotope-ratio mass spectrometer 118 that is operatively coupled with the water separator 112. As shown, the outlet 114B of the water separator 112 is operatively coupled with the isotope-ratio mass spectrometer 118, to enable a flow of the dehydrated oxidised gaseous components into the isotope-ratio mass spectrometer 118. As shown, the isotope-ratio mass spectrometer 118 comprises an ion source 120 for generating ion beams associated with each of the oxidized gaseous components. For example, when the oxidized gaseous components comprise carbon dioxide ($CO_2$), ethylene dione ($C_2O_2$), and carbon suboxide ($C_3O_2$), the ion source 120 is operable to produce ion beams associated with each of carbon dioxide ($CO_2$), ethylene dione ($C_2O_2$), and carbon suboxide ($C_3O_2$), respectively. Furthermore, the ion source 120 is enclosed in a vacuum chamber 122 that is operatively coupled with a pump arrangement 124. The pump arrangement 124 comprises a vacuum gauge 126, a turbo pump 128 and an oil free diaphragm pump 130. It will be appreciated that the turbo pump 128 and the diaphragm pump 130 enable air to be removed from the vacuum chamber 122, for generating of vacuum therein.

The isotope-ratio mass spectrometer 118 comprises a magnetic sector mass analyser 132 for receiving the generated ion beams from the ion source 120, wherein the mass analyser 132 is operable to determine isotopic concentrations associated with each of the ion beams; it will be appreciated that magnetic sector analysers are significantly more stable than other mass spectrometers, for example quadrupole analysers. The mass analyser 132 is operable, namely configured, to separate isotopes of each of the ion beams and subsequently, to determine an isotopic concentration thereof. For example, the ion beams are associated with oxidized gaseous components of Methane ($CO_2$), Ethane ($C_2O_2$), and Propane ($C_3O_2$). In such an example, the mass analyser 132 is operable to separate carbon dioxide ($CO_2$) into its isotopes associated with $^{12}C$ (associated with carbon atoms having an atomic number of 12 and/or mass number of 44) and $^{13}C$ (associated with carbon atoms having an atomic number of 13 and/or mass number of 45). Similarly, when the gaseous component is ethylene dione ($C_2O_2$), the mass analyser 132 is operable, namely configured, to separate the ethylene dione ($C_2O_2$) into its isotopes associated with $^{12}C_2$ and $^{13}C_2$. Moreover, the mass analyser 132 is operable, namely configured, to separate the carbon suboxide ($C_3O_2$) into its isotopes, such as $^{12}C_3$ and $^{13}C_3$.

In an embodiment, the ion source 120 and the mass analyser 132 are arranged in a housing. For example, the ion source 120 and the mass analyser 132 are arranged in the housing implemented as a vertical cabinet. In such an example, the ion source 120, the mass analyser 132 and the cabinet form a single unit. Optionally, the mass analyser 132 is arranged spatially under the ion source 120 within the cabinet when the mass analyser 132 is being operated. It will be appreciated that when the system 100 is used on-site, for example, on-site of a drilling operation, the system 100 is operable to experience vibrations and/or shock. In such an example, the ion source 120, the mass analyser 132 and the housing are arranged to be movable as a single unit, namely as a unitary apparatus arrangement. Such an arrangement provides for increased operating robustness, by reducing a risk of damage due to individual movement of each of the ion source 120 and the mass analyser 132 when experiencing the vibrations and/or shock. According to one embodiment, the isotope-ratio mass spectrometer 118 is arranged with a shock absorbing arrangement to absorb shocks and vibration being coupled to the isotope-ratio mass spectrometer 118 when in operation. For example, the isotope-ratio mass spectrometer 118 is mounted on the shock absorbing arrangement. The shock absorbing arrangement enables, as an aforementioned, to absorb the aforementioned vibrations and/or shock experienced by the isotope-ratio mass spectrometer 118 (and therefore, the ion source 120 and the mass analyser 132), thereby, further reducing damage and wear experienced by the isotope-ratio mass spectrometer 118 during operation of the system 100.

A magnetic material, for example Hycomax 8, that is stable at high temperatures, for example at temperatures greater than 60° C., for example at temperatures greater than 120° C., is used for implementing a mass spectrometer analyser magnet 134 for the mass analyser 132, thereby reduces mass position drift when ambient conditions vary in operation.

In an embodiment, the mass analyser 132 comprises the aforesaid mass analysing magnet 134 for deflecting the ion beams received from the ion source 120. The mass analysing magnet 134 is operable to deflect ions of isotopes associated with each of the ion beams along corresponding different paths, based upon a mass-to-charge ratio of the isotope ions. For example, isotopes ions having a lower mass-to-charge ratio (such as the isotope $^{12}C$) experience lesser deflection as compared to isotope ions having a higher mass-to-charge ratio (such as the isotope $^{13}C$), for each isotope associated with each of the ion beams. In the same embodiment, the mass analyser 132 comprises a plurality of detectors 136 for detecting isotopic concentrations associated with each of the deflected ion beams. In one example, the plurality of detectors 136 is implemented using Faraday cups that are operable, namely configured, to receive the deflected ion beams. In such an example, a signal (such as a current pulse) is generated when a given ion is detected at a corresponding one of the Faraday cups, thereby, enabling determination of the isotopic concentrations associated with each of the ion beams.

In one embodiment, the determined isotopic concentrations associated with each of the ion beams are employed in a feedback loop to modify an amount of the carrier gas that is used for diluting the gaseous sample, based on threshold isotopic concentrations associated with each of the ion beams. For example, during operation of the system, isotopic concentrations associated with the gaseous sample may increase beyond a working dynamic range of one or more components of the system, such as gas chromatograph, the combustion furnace and the mass spectrometer. In such an example, a sample diluter is employed in a feedback loop, such that the sample diluter controls a flow of the carrier gas to the inlet, to dilute the gaseous sample using the carrier gas to the threshold isotropic concentration. The term "threshold isotopic concentration" as used herein, refers to a predetermined isotopic concentration of isotopes associated with the gaseous sample, such that the predetermined isotopic concentration lies within the working dynamic range of the one or more components of the system. In one embodiment, the system further comprises a dilution adjustment device operatively coupled to the sample diluter. The dilution adjustment device is further operatively coupled to the mass analyser 132, wherein the dilution adjustment device is operable to receive the determined isotopic concentrations associated with each of the ion beams (for example, as a digital signal therefrom). Subsequently, the dilution adjustment device is operable to employ the determined isotopic concentrations associated with each of the ion beams to modify an amount of the carrier gas employed to dilute the gaseous sample, based on threshold isotopic concentrations associated with each of the ion beams. For example, the dilution adjustment device is operable to receive the determined isotopic concentrations associated with each of the ion beams from the mass analyser 132 and consequently, the dilution adjustment device is operable to provide a signal to the sample diluter to increase or decrease the amount of the carrier gas used to dilute the gaseous sample, such that the isotopic concentrations associated with each of the ion beams is determined to be less than or equal to the threshold isotopic concentrations associated with each of the ion beams in a subsequent cycle. Thus, the feedback loop is established between the dilution adjustment device, the sample diluter and the mass analyzer 132. In one embodiment, the dilution adjustment device is operable to adjust the amount of the carrier gas employed to dilute the gaseous sample, iteratively and in real time. For example, the dilution adjustment device, upon receiving the determined isotopic concentrations associated with each of the ion beams from the mass analyzer 132, is operable, namely configured, to increase or decrease the amount of the carrier gas instantaneously, such that the isotopic concentrations associated with each of the ion beams is determined to be below the threshold isotopic concentrations. Furthermore, upon determining a change in the determined isotopic concentrations associated with each of the ion beams, the dilution adjustment device is operable, namely configured to instantaneously adjust the amount of carrier gas employed to dilute the gaseous sample, to iteratively modify the amount of carrier gas employed to dilute the gaseous sample. Such a system employing the dilution adjustment device enables the gaseous sample provided at the input to be associated with constant isotopic concentrations (such as, below the threshold isotopic concentrations) and is further, continuously adjusted at high speed (or instantaneously) giving real time gaseous sample auto ranging. The feedback loop is used to provide the diluted sample having a substantially constant ("substantially constant" is to be construed to be in a range of 90% to 100%, more optionally in a range of 95% to 100%) dilution of the gaseous sample. For example, upon determination of high isotopic concentrations in one or more of the ion beams, an amount of the carrier gas that is used to dilute the gaseous sample is increased. Alternatively, upon determination of low isotopic concentrations in one or more of the ion beams, the amount of the carrier gas that is used to dilute the gaseous sample is decreased. In one example, the feedback loop is used to achieve a constant 50% dilution of the gaseous sample flowing into the at least one gas chromatograph 108. Furthermore, by providing such a constant dilution of the gaseous sample, improved reproducibility is measurements associated with determination of isotopic composition of various gaseous samples is achievable during operation of the system 100 (such as, due to the combustion furnace 110 and the mass analyser 132 being associated with linear ranges of operation, respectively).

The isotope-ratio mass spectrometer 118 is operable, namely configured, to use the determined isotopic concentrations associated with each of the ion beams to determine the isotopic composition of the gaseous sample. For example, the isotope-ratio mass spectrometer 118 comprises a current sensor 138 that is communicably coupled in operation with analogue-to-digital (ADC) converters 140. The current sensor 138 is operable, namely configured, to sense amperage (namely, magnitude) associated with the current pulses generated by the plurality of detectors 136. Furthermore, the analogue-to-digital converters 140 are operable, namely configured, to convert the analogue signals obtained from the current sensor 138 to corresponding digital signals. As shown, the isotope-ratio mass spectrometer 118 comprises a data processing arrangement 142 that is communicably coupled with the analogue-to-digital converters 140. In one example, the data processing arrangement 142 is implemented using a PIC microcontroller. The data processing arrangement 142 is operable, namely configured, to receive the digital signals associated with detected isotopic concentrations from the analogue-to-digital converters 140 and perform analysis thereof, to determine the isotopic composition of the gaseous sample (as described herein below).

The isotope-ratio mass spectrometer 118 is operable, namely, configured to determine the isotopic concentrations associated with each of the ion beams as ratios. For example, when the ion beam is associated with carbon dioxide ($CO_2$), the isotope-ratio mass spectrometer 118 is operable (namely, configured) to determine a ratio of isotopic concentrations of $^{13}C$ and $^{12}C$ ions associated with the gaseous sample. Subsequently, the isotope-ratio mass spectrometer 118 is operable, namely configured, to use a predetermined ratio of isotopic concentrations of $^{13}C$ and $^{12}C$ ions associated with a reference gaseous sample of carbon dioxide ($CO_2$). Furthermore, the isotope-ratio mass spectrometer 118 is operable, namely configured, to determine a delta value (b) associated with measured concentrations each of the detected isotopes. Optionally, the delta value is determined in accordance with Pee Dee Belemnite (PDB) standard or Vienna PDB (VPDB) standard. For example, the delta value (b) is determined using a formula, for example, as described below:

$$\delta \text{Sample} = \left( \frac{\frac{13C}{12C}\text{Sample}}{\frac{13C}{12C}\text{Reference}} - 1 \right) * 1000\% \qquad (\text{Eq. 1})$$

wherein $$\frac{13C}{12C}$$

Sample is the determined ratio of isotopic concentrations of $^{13}C$ and $^{12}C$ associated with the gaseous sample of carbon dioxide ($CO_2$) and $$\frac{13C}{12C}$$

Reference is the predetermined ratio of isotopic concentrations associated with the reference gaseous sample of carbon dioxide ($CO_2$). Furthermore, δSample is an isotopic concentration associated with the isotope $^{13}C$, represented in parts per thousand (represented as $\delta^{13}C$).

Subsequently, the data processing arrangement 142 is operable to determine the isotopic composition of the gaseous sample by using isotopic concentrations of each detected isotope, associated with all of the gaseous components separated from the gaseous sample. Optionally, the determined isotopic composition of the gaseous sample is graphically represented on a user interface (shown in FIG. 2), for example on a graphical user interface (GUI). For example, the data processing arrangement 142 is communicably coupled with a display arrangement. In such an example, the data processing arrangement 142 is operable to render the graphical representation of the determined isotopic composition of the gaseous sample on a user interface associated with the display arrangement.

According to one embodiment, the isotope-ratio mass spectrometer 118 is calibrated using the reference gaseous sample. The isotope-ratio mass spectrometer 118 may be required to be calibrated before initiating operation of the system 100 (such as, during a setup phase of the system 100). Alternatively, during prolonged operation of the system 100, one or more components of the system 100 (such as the isotope-ratio mass spectrometer 118) may experience a malfunction, thereby causing an error in determined isotopic compositions of gaseous samples. In such a situation, a recalibration of the isotope-ratio mass spectrometer 118 using the reference gaseous sample enables such errors to be taken into account and/or corrected. The system 100 is beneficially used to determine a reference isotopic composition of the reference gaseous sample. The reference gaseous sample is allowed to flow into the system 100 using a reference gas sample inlet 150. As the reference, gaseous sample is associated with a corresponding predetermined isotopic composition, the reference gaseous sample may not be required to flow through the at least one gas chromatograph 108 and the combustion furnace 110. Furthermore, the reference isotopic composition of the reference gaseous sample is determined using the system 100, specifically, using the isotope-ratio mass spectrometer 118. In such a situation, the determined reference isotopic composition is compared with the predetermined isotopic composition of the reference gaseous sample to determine a correction factor. In an example, the correction factor is associated with a difference between the predetermined isotopic composition and the determined reference isotopic composition of the reference gaseous sample. Subsequently, the isotope-ratio mass spectrometer 118 is calibrated using the correction factor, to correct an error associated with the isotope-ratio mass spectrometer 118 and/or prior to starting operation of the system 100. Optionally, the aforementioned steps are iterated by using a plurality of reference gaseous samples to improve an accuracy associated with the determined correction factor.

Figure 2:
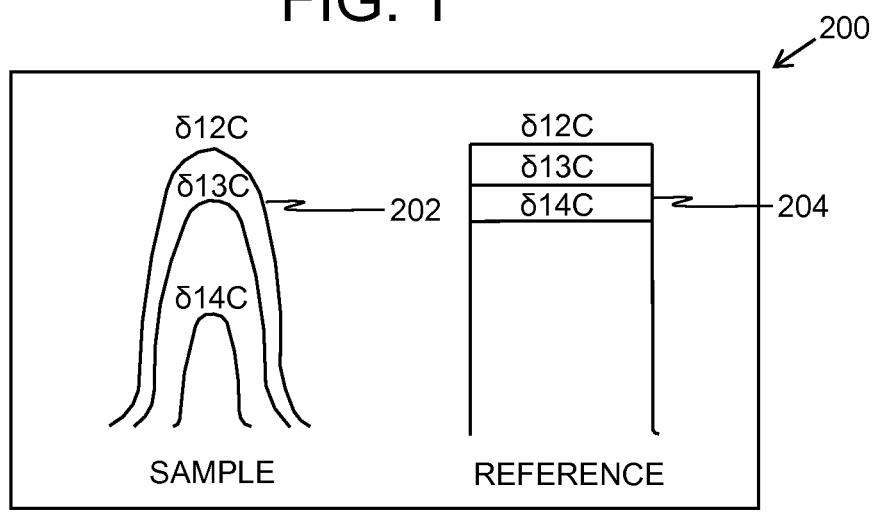
FIG. 2 is an illustration of a user interface for depicting a graphical representation of isotopic compositions of a gaseous sample with respect to a reference gaseous sample, in accordance with an embodiment of the present disclosure.

Referring to FIG. 2, there is shown an illustration of a user interface 200 depicting a graphical representation of isotopic compositions of a gaseous sample with respect to a reference gaseous sample, in accordance with an embodiment of the present disclosure. The user interface 200 is rendered on a display device (not shown). As shown, the user interface 200 graphically depicts a determined isotopic composition 202 of the gaseous sample corresponding to isotopic concentrations associated with various isotopes, represented as delta values $\delta^{12}C$, $\delta^{13}C$ and $\delta^{14}C$. Furthermore, the user interface depicts a predetermined isotopic composition 204 of the reference gaseous sample corresponding to isotopic concentrations of isotopes represented by delta values $\delta^{12}C$, $\delta^{13}C$ and $\delta^{14}C$.

Figure 3:
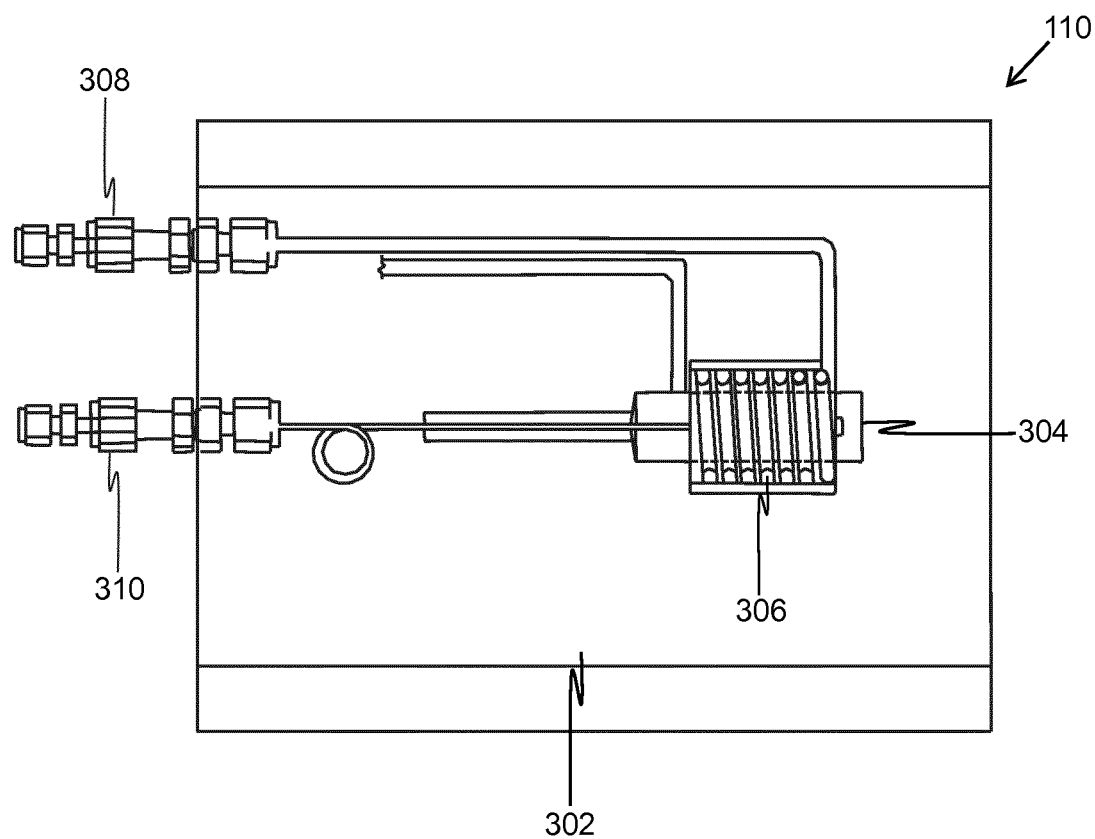
FIG. 3 is a sectional view of the combustion furnace of the system of FIG. 1, in accordance with an embodiment of the present disclosure.

Referring to FIG. 3, there is shown a sectional view of the combustion furnace 110 of FIG. 1, in accordance with an embodiment of the present disclosure. The combustion furnace 110 comprises a furnace box 302 that is operable, namely configured, to incorporate various components of the combustion furnace 110 therein. Furthermore, the combustion furnace 110 comprises a cartridge heater 304. The cartridge heater 304 is a joule heating element that is operable, namely configured, to produce heat energy when electric current is passed therethrough. In one example, an operation of the cartridge heater 304 is associated with a power consumption in a range of 200 to 300 Watts. In another example, the cartridge heater 304 is capable of producing an operating temperature in a range of 750° C. to 850° C.

As shown, the combustion furnace 110 also comprises a cylindrical tube 306 wound around the cartridge heater 302. In an embodiment, the cylindrical tube 306 is fabricated using a metal or metal allow, for example stainless steel. The cylindrical tube 306 is operatively coupled with an inlet 308 wherefrom the gaseous sample is drawn into the combustion furnace 110. Furthermore, the cylindrical tube 306 comprises an oxidation catalyst to promote oxidation of the gaseous components flowing therethrough. In one embodiment, the oxidation catalyst is platinised copper oxide. For example, the oxidation catalyst is implemented as granules of platinised copper oxide that are arranged along a length of the cylindrical tube 306. The oxidation catalyst enables oxidation of the gaseous components at a lower temperature as compared to conventional combustion furnaces that do not employ the oxidation catalyst therein. Furthermore, the oxidation of the gaseous components at the lower temperature increases an operating life of the combustion furnace 110 and consequently, the system 100. Moreover, the cylindrical tube 306 is operatively coupled with an outlet 310. The gaseous components that have undergone oxidation while passing through the cylindrical tube 306 are extracted from the outlet 310.

Figure 4:
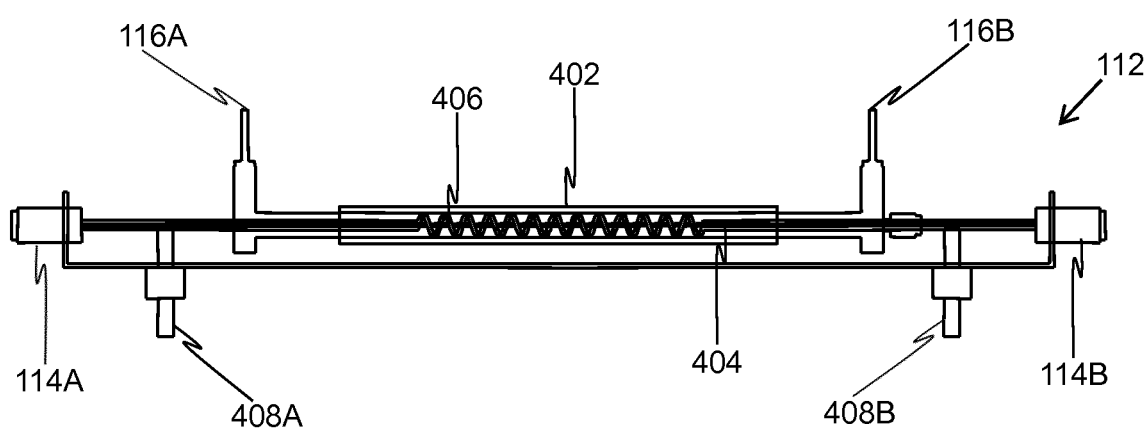
FIG. 4 is a sectional view of a water separator of the system of FIG. 1, in accordance with an embodiment of the present disclosure.

Referring to FIG. 4, there is shown a sectional view of the water separator 112 of FIG. 1, in accordance with an embodiment of the present disclosure. As shown, the water separator 112 comprises a hollow cylindrical casing 402. The hollow cylindrical casing 402 incorporates various components of the water separator 112 therein. In an embodiment, the hollow cylindrical casing 402 is fabricated using glass, for example silica glass. Furthermore, the water separator 112 comprises a cylindrical support 404 incorporated within the hollow cylindrical casing 402. For example, the cylindrical support 404 is implemented as a wire that is arranged through a centre of the hollow cylindrical casing 402. Moreover, the water separator 112 comprises an elongate wire (not shown) helically coiled around the cylindrical support 404 and a tube 406 surrounding the elongate wire. The elongate wire acts as a base for supporting the tube 406. Furthermore, coiling of the tube 406 around the cylindrical support 404 increases a surface area of the tube 406 while enabling the water separator 112 to maintain a compact form factor, thereby, increasing an efficiency associated with the water separator 112. According to one embodiment, the tube 406 is fabricated using Nafion polymer.

In operation, the oxidized gaseous components are allowed to flow into the water separator 112 through the inlet 114A. Subsequently, the oxidized gaseous components flow through the tube 406 coiled around the cylindrical support 404. During such a flow of the oxidized gaseous components through the tube 406, the carrier gas flows into the water separator 112 through the inlet 116A. Furthermore, during flow of the oxidized gaseous components helically through the tube 406, the carrier gas flows along an outer surface of the tube 406. Such a flow of the carrier gas enables to capture moisture that has been separated from the gaseous components through walls of the tube 406. The dehydrated oxidized gaseous components flow out of the water separator 112 through the outlet 114B. Moreover, the carrier gas, having a higher moisture content in comparison to the carrier gas at inlet 116A, is removed from the water separator 112 through the outlet 116B.

In an embodiment, the water separator 112 is arranged with a shock absorbing arrangement 408A-B. Such a shock absorbing arrangement 408A-B enables absorption of shocks and/or vibrations experienced by the water separator 112 during operation of the system 100, for example, on-site of a drilling operation. Consequently, wear and/or damage experienced by the water separator 112 (and the system 100) is substantially reduced and an operating life of the system 100 is increased.

Figure 5:
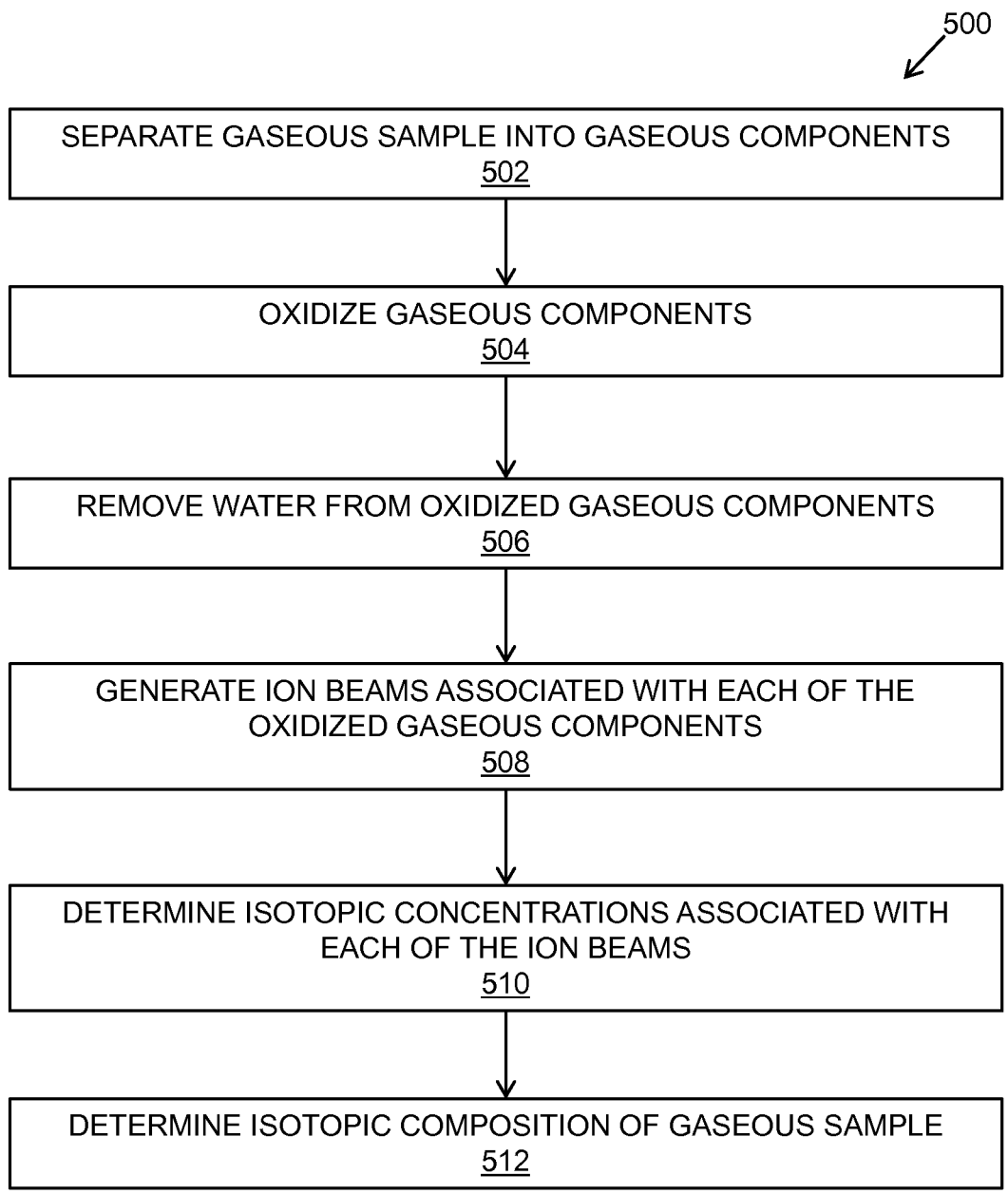
FIG. 5 is an illustration of steps of a method of determining an isotopic composition of a gaseous sample, in accordance with an embodiment of the present disclosure.

Referring to FIG. 5, there are shown steps of a method 500 of determining an isotopic composition of a gaseous sample, in accordance with an embodiment of the present disclosure. At a step 502, the gaseous sample is separated into gaseous components using at least one gas chromatograph. At a step 504, the gaseous components are oxidized in a combustion furnace. At a step 506, water is removed from the oxidized gaseous components using a water separator. At a step 508, ion beams associated with each of the oxidized gaseous components are generated using an ion source associated with an isotope-ratio mass spectrometer. At a step 510, isotopic concentrations associated with each of the ion beams are determined using a mass analyser. At a step 512, the isotopic composition of the gaseous sample is determined by the isotope-ratio mass spectrometer using the isotopic concentrations associated with each of the ion beams.

The steps 502 to 512 are only illustrative and other alternatives can also be provided where one or more steps are added, one or more steps are removed, or one or more steps are provided in a different sequence without departing from the scope of the claims herein. In an example, the method further comprises diluting the gaseous sample using a carrier gas. In another example, the method further comprises using a feedback loop to modify an amount of the carrier gas that is used for diluting the gaseous sample, based on the determined isotopic concentrations associated with each of the ion beams. In yet another example, the method further comprises generating at least one chromatogram associated with the at least one gas chromatograph after separating the gaseous sample into the gaseous components.

In one example, a first gas chromatograph and a second gas chromatograph of the at least one gas chromatograph are used together for separating the gaseous sample into gaseous components. In another example, the method further comprises correlating a first chromatogram associated with the first gas chromatograph and a second chromatogram associated with the second gas chromatograph to obtain an elution order of the gaseous components. In yet another example, the method further comprises determining a reference isotopic composition of a reference gaseous sample associated with a predetermined isotopic composition; determining a correction factor for the isotope-ratio mass spectrometer by correlating the determined reference isotopic composition with the predetermined isotopic composition associated with the reference sample; and calibrating the isotope-ratio mass spectrometer using the determined correction factor.

Furthermore, disclosed is a software product recording on machine-readable data storage media, characterised in that the software product is executable upon computing hardware for implementing the aforementioned method of determining isotopic composition of a gaseous sample.

In the foregoing, there is disclosed the system and the method of determining isotopic composition of gaseous samples, and the software product executable upon computing hardware for implementing the aforementioned method. The system comprises at least one gas chromatograph for separating the gaseous sample into gaseous components. The at least one gas chromatograph may be implemented using two or more gas chromatographs, such as the first gas chromatograph and the second gas chromatograph. Such an implementation of the at least one gas chromatograph enables reduction in time required for separation of the gaseous sample into gaseous components, thereby, enabling faster analysis thereof using the system. Furthermore, chromatograms associated with the two or more gas chromatograms may be correlated to determine the elution order of the gaseous components. Such a correlation of the chromatograms enables to increase an accuracy associated with the determined elution order. Moreover, the system comprises the combustion furnace. Such a combustion furnace may be implemented using a cartridge heater associated with lower power consumption for combustion (or oxidation) of the gaseous components. It will be appreciated that such decrease in power consumption by the combustion furnace enables to increase a power efficiency associated with operation of the system. Furthermore, use of the oxidation catalyst in the combustion furnace enables oxidation of gaseous components at lower operating temperatures of the system, thereby, enabling improved operating life of the system. The system comprises the water separator. The water separator may be implemented using the coiled cylindrical tube for flow of gaseous components therethrough. Such an implementation of the water separator enables a reduction in dimensions thereof, consequently, enabling to provide the system having a more compact form factor. Additionally, the tube used in the water separator may be fabricated using Nafion polymer. Such a fabrication of the tube enables a requirement of use of hazardous chemicals (such as magnesium perchlorate) within the system to be eliminated, for dehydration of the gaseous components. In such an example, a safety associated with use of the system is increased. Moreover, the system comprises the isotope-ratio mass spectrometer operatively coupled with the water separator, to determine the isotopic composition of the gaseous sample. The isotope-ratio mass spectrometer comprises the ion source for generating ion beams associated with each of the oxidized gaseous components and the mass analyser for receiving the generated ion beams from the ion source. Such an isotope-ratio mass spectrometer may be implemented by incorporating the ion source and the mass analyser within the housing. It will be appreciated that such an implementation enables the isotope-ratio mass spectrometer to act as a single unit, namely as a unitary apparatus, thereby, allowing the system to be resistant to damage from mechanical vibrations and shock. Additionally, the isotope-ratio mass spectrometer may be arranged with the shock-absorbing arrangement. Such an arrangement further enables to reduce an impact associated with mechanical vibrations and/or shock experienced by the system. The reduction in the impact of mechanical vibrations and/or shock enables the system to be more damage-resistant and also, allows operation thereof on-site, such as, of a drilling operation. It will be appreciated that the on-site operation of the system enables to provide increased accuracy and reduced analysis time for the system as compared to conventional arrangements for determination of isotopic compositions of gaseous components. Therefore, the present disclosure provides a compact and reliable system and method of determining isotopic composition of gaseous samples.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system that is configured to determine isotopic composition of a gaseous sample, wherein the system comprises:
at least one gas chromatograph that is configured to separate the gaseous sample into gaseous components;
a combustion furnace operatively coupled with the at least one gas chromatograph for oxidizing the gaseous components, wherein the combustion furnace comprises a cartridge heater surrounded with a cylindrical tube wound comprising an oxidation catalyst to promote oxidation of the gaseous components, wherein the oxidation catalyst is platinized copper oxide;
a water separator that is operatively coupled with the combustion furnace, wherein the water separator is configured to remove water from the oxidized gaseous components;
a first shock absorbing arrangement arranged with the water separator, wherein the shock absorbing arrangement is configured to reduce transmission of shocks from water separator to the system; and
an isotope-ratio mass spectrometer that is operatively coupled with the water separator, the isotope-ratio mass spectrometer comprising:
an ion source that is configured to generate ion beams associated with each of the oxidized gaseous components;
a mass analyzer that is configured to receive the generated ion beams from the ion source, wherein the mass analyzer is configured to determine isotopic concentrations associated with each of the ion beams; and
a second shock absorbing arrangement arranged with the isotope-ratio mass spectrometer, wherein the second shock absorbing arrangement is configured to reduce transmission of shocks from the isotope-ratio mass spectrometer to the system,
wherein the isotope-ratio mass spectrometer is configured to use the determined isotopic concentrations associated with each of the ion beams to determine the isotopic composition of the gaseous sample.

2. A system of claim 1, wherein the ion source and the mass analyzer are arranged in a housing, wherein the mass analyzer is arranged under an ion source within the housing.

3. A system of claim 1, wherein the system further comprises a flow restricting arrangement for controlling an amount of the gaseous sample flowing to the system.

4. A system of claim 3, wherein the mass analyzer comprises:
a mass analyzing magnet that is configured to deflect the ion beams received from the ion source; and
a plurality of detectors that are configured to detect isotopic concentrations associated with each of the deflected ion beams,
wherein the mass analyzing magnet is made of a thermodynamically stable material.

5. A system of claim 4, further comprising a sample diluter operatively coupled with the at least one gas chromatograph, wherein the sample diluter is operable to dilute the gaseous sample using a carrier gas.

6. A system of claim 1, further comprising a dilution adjustment device operatively coupled to the sample diluter, wherein the dilution adjustment device is operable to employ the determined isotopic concentrations associated with each of the ion beams to modify an amount of the carrier gas employed to dilute the gaseous sample, based on threshold isotopic concentrations associated with each of the ion beams.

7. A system of claim 6, wherein the dilution adjustment device is operable to modify the amount of the carrier gas employed to dilute the gaseous sample, iteratively and in real time.

8. A system of claim 1, wherein the water separator comprises:
a hollow cylindrical casing;
a cylindrical support incorporated within the hollow cylindrical casing;
an elongate wire helically coiled around the cylindrical support; and
a tube surrounding the elongate wire;
wherein, in operation, the oxidized gaseous components flow through the tube coiled around the cylindrical support.

9. A system of claim 8, wherein the hollow cylindrical casing is fabricated using glass.

10. A system of claim 1, further comprising a first gas chromatograph and a second gas chromatograph wherein both the first gas chromatograph and the second gas chromatograph are connected to an inlet of the system at the same time.

11. A system of claim 9, wherein the first gas chromatograph is configured to generate a first chromatogram and the second gas chromatograph is configured to generate a second chromatogram to obtain an elution order of the gaseous components.

12. A method of determining isotopic composition of a gaseous sample, wherein the method comprises:
(i) separating the gaseous sample into gaseous components using at least one gas chromatograph;
(ii) oxidizing the gaseous components in a combustion furnace, wherein the combustion furnace comprises a cartridge heater surrounded with a cylindrical tube wound comprising an oxidation catalyst to promote oxidation of the gaseous components, wherein the oxidation catalyst is platinized copper oxide;
(iii) removing water from the oxidized gaseous components using a water separator;
(iv) generating ion beams associated with each of the oxidized gaseous components using an ion source associated with an isotope-ratio mass spectrometer;
(v) determining isotopic concentrations associated with each of the ion beams using a mass analyzer; and
(vi) determining by the isotope-ratio mass spectrometer, the isotopic composition of the gaseous sample using the isotopic concentrations associated with each of the ion beams.

13. A method of claim 12, further comprising controlling an amount of the gaseous sample flowing to the system using a flow restricting arrangement.

14. A method of claim 13, further comprising diluting the gaseous sample under flow conditions using a carrier gas.

15. A method of claim 14, further comprising injecting the carrier gas at a sample port wherein the sample port is included upstream of the at least one gas chromatograph.

16. A method of claim 15, further comprising using a feedback loop to modify an amount of the carrier gas that is used for diluting the gaseous sample, by employing the determined isotopic concentrations associated with each of the ion beams, based on threshold isotopic concentrations associated with each of the ion beams.

17. A method of claim 16, further comprising generating at least one chromatogram associated with the at least one gas chromatograph after separating the gaseous sample into the gaseous components.

18. A method of claim 17, further comprising separating the gaseous sample into gaseous components using a first gas chromatograph and a second gas chromatograph wherein both the first gas chromatograph and the second gas chromatograph are connected to an inlet of the system at the same time.

19. A method of claim 18, further comprising correlating a first chromatogram associated with the first gas chromatograph and a second chromatogram associated with the second gas chromatograph to obtain an elution order of the gaseous components.

20. A method of claim 12, further comprising:
determining a reference isotopic composition of a reference gaseous sample associated with a predetermined isotopic composition;
determining a correction factor for the isotope-ratio mass spectrometer by correlating the determined reference isotopic composition with the predetermined isotopic composition associated with the reference sample; and
calibrating the isotope-ratio mass spectrometer using the determined correction factor.

* * * * *